United States Patent [19]

Bekele

[11] Patent Number: 5,202,188
[45] Date of Patent: Apr. 13, 1993

[54] VINYLIDENE CHLORIDE FILM

[75] Inventor: Solomon Bekele, Taylors, S.C.

[73] Assignee: W. R. Grace & Co.-Conn., Duncan, S.C.

[21] Appl. No.: 749,057

[22] Filed: Aug. 23, 1991

[51] Int. Cl.$^5$ .................................. B32B 27/38
[52] U.S. Cl. ................................ 428/414; 428/516; 428/517; 428/520; 428/910; 524/306
[58] Field of Search ............... 428/517, 516, 414, 910, 428/520

[56] References Cited

U.S. PATENT DOCUMENTS

| | | | |
|---|---|---|---|
| Re. 29,040 | 11/1976 | Marzolf | 260/42 |
| 2,205,449 | 6/1940 | Wiley | 18/48 |
| 2,320,112 | 5/1943 | Wiley | 18/18 |
| 2,431,078 | 11/1947 | Powell, 3rd. | 260/32 |
| 2,562,204 | 7/1951 | Milton, Jr. | 18/58 |
| 2,862,023 | 11/1958 | Fields | 260/485 |
| 2,919,059 | 12/1959 | Sporka | 229/3.5 |
| 3,144,425 | 8/1964 | Koch et al. | 260/29 |
| 3,165,491 | 1/1965 | Butzler et al. | 260/31 |
| 3,166,526 | 1/1965 | Butzler et al. | 260/31 |
| 3,194,778 | 7/1965 | Butzler et al. | 260/31 |
| 3,206,427 | 9/1965 | Butzler et al. | 260/31 |
| 3,224,996 | 12/1965 | Balmer et al. | 260/31 |
| 3,275,716 | 9/1966 | Wiggins | 260/899 |
| 3,373,229 | 3/1968 | Philpot et al. | 260/899 |
| 3,375,216 | 3/1968 | Smith et al. | 260/30 |
| 3,375,217 | 3/1968 | Smith et al. | 260/30 |
| 3,426,101 | 2/1969 | Ryan et al. | 260/876 |
| 3,524,795 | 8/1970 | Peterson | 161/165 |
| 3,678,133 | 7/1972 | Ryan | 260/876 |
| 3,741,253 | 6/1973 | Brax et al. | 138/137 |
| 3,846,828 | 11/1974 | Klein | 260/33 |
| 3,859,384 | 1/1975 | Carty et al. | 260/876 |
| 3,859,389 | 1/1975 | Carty et al. | 260/885 |
| 3,867,481 | 2/1975 | Whang | 260/899 |
| 3,923,720 | 12/1975 | Coaker et al. | 260/31 |
| 3,948,674 | 4/1976 | Coaker et al. | 106/178 |
| 4,112,181 | 9/1978 | Baird, Jr. et al. | 428/336 |
| 4,144,289 | 3/1979 | Watanabe et al. | 260/897 |
| 4,184,993 | 1/1980 | Singh et al. | 260/31 |
| 4,203,880 | 5/1980 | Stoloff et al. | 260/23 |
| 4,210,565 | 7/1980 | Emmons | 260/29 |
| 4,212,958 | 7/1980 | Falk | 525/310 |
| 4,269,740 | 5/1981 | Woods et al. | 260/4 R |
| 4,360,612 | 11/1982 | Trumbull et al. | 523/351 |
| 4,399,248 | 8/1983 | Singh et al. | 524/205 |
| 4,401,788 | 8/1983 | Hiyoshi et al. | 524/714 |
| 4,418,168 | 11/1983 | Johnson | 524/109 |
| 4,486,378 | 12/1984 | Hirata et al. | 264/512 |
| 4,542,185 | 9/1985 | Meunier | 525/70 |
| 4,547,428 | 10/1985 | Bekker et al. | 428/402 |
| 4,567,234 | 1/1986 | Meunier | 525/73 |
| 4,686,148 | 8/1987 | Havens | 428/520 |
| 4,698,111 | 10/1987 | Havens | 156/244 |
| 4,746,705 | 5/1988 | Courtis et al. | 525/308 |
| 4,950,718 | 8/1990 | Burgert et al. | 525/185 |
| 4,959,416 | 9/1990 | Sun | 525/222 |
| 4,963,622 | 10/1990 | Heitz | 525/227 |
| 4,965,136 | 10/1990 | Mueller | 428/414 |
| 5,001,192 | 3/1991 | Sun | 525/76 |
| 5,030,511 | 7/1991 | Moffitt | 428/336 |
| 5,035,955 | 7/1991 | Matsukura et al. | 428/520 |
| 5,041,287 | 8/1991 | Driggers et al. | 424/81 |
| 5,055,529 | 10/1991 | Kishida et al. | 525/309 |
| 5,077,331 | 12/1991 | Fahey et al. | 524/317 |
| 5,084,500 | 1/1992 | Yamada et al. | 524/417 |

FOREIGN PATENT DOCUMENTS

| | | |
|---|---|---|
| 597519 | 5/1990 | Australia . |
| 968689 | 6/1975 | Canada . |
| 2030695 | 5/1991 | Canada . |
| 3605405-A | 12/1987 | Fed. Rep. of Germany . |
| 61-221253 | 10/1986 | Japan . |
| 91/08260 | 6/1991 | World Int. Prop. O. . |

Primary Examiner—P. C. Sluby
Attorney, Agent, or Firm—William D. Lee, Jr.; Jennifer L. Skord; Mark B. Quatt

[57] ABSTRACT

A film with properties such as good thermal stability, enhanced extrudability, improved oxygen barrier properties, and reduced stickiness to metal surfaces is made by the use of a vinylidene chloride composition with small amounts of a plasticizer (such as epoxidized oil or epoxidized alpha olefin), and acrylate/styrene polymer (such as methyl methacrylate/butyl acrylate/styrene polymer) or poly(alpha-methylstyrene).

8 Claims, No Drawings

VINYLIDENE CHLORIDE FILM

FIELD OF INVENTION

This invention relates to films made from vinylidene chloride polymers or copolymers. Specifically, this invention relates to a method and composition for lowering the oxygen transmission and stickiness, and enhancing the thermal stability and extrusion rate of mono-layer and multi-layer packaging films having a plasticized layer of vinylidene chloride copolymer film.

BACKGROUND OF THE INVENTION

Thermoplastic packaging films made of vinylidene chloride copolymer, hereinafter referred to generally as "saran", have been used for a long number of years to package food products which include cheese, fresh and processed meats, and a wide variety of other food and non-food items. Examples of such films are disclosed in U.S. Pat. No. 2,919,059 which issued in December 1959 to Arthur F. Sporka. This patent discloses laminate films of cellophane-saran-polyethylene and polyethylene-saran-polyethylene which are made by treating the polyethylene film surface to enhance its cling sheer strength so that a laminate or multi-layer film can be made by using the inherent attractive forces in the face-to-face surfaces of adjoining plies of preformed film.

A later and more satisfactory method of producing a multi-layer film having a layer of saran is disclosed in U.S. Pat. No. 4,112,181 which issued on Sep. 5, 1978 to William G. Baird, Jr. et al. In this patent a method of coextruding a tubular film is described wherein the walls of the tube have at least three layers, a center layer being a saran layer. The tubular film is subsequently biaxially oriented by the trapped bubble technique.

Another satisfactory method of producing a multi-layer saran film is disclosed in U.S. Pat. No. 3,741,253 which issued on Jun. 26, 1973 to Harri J. Brax et al, which specifically discloses a multi-layer, biaxially oriented film having a saran barrier layer. This film is made by an extrusion coating process in which a substrate of polyethylene or ethylene vinyl acetate copolymer is coextruded in the form of a tube, cross-linked by irradiation, inflated into a tubing, a layer of saran extrusion coated onto the inflated tubing, and then another layer of ethylene-vinyl acetate copolymer is coated onto the saran. After cooling, this multi-layer tubular structure is flattened and rolled up. At a later time, the tube is inflated, sent through a hot water bath where it is heated to its orientation temperature, and as it is drawn out of the the bath, it is inflated into a bubble thereby biaxially orienting the film. The bubble is rapidly cooled to set the orientation. This process produces a shrinkable barrier film with low oxygen permeability. Also, the advantages of a cross-linked film are provided without subjecting the saran layer to irradiation which tends to degrade saran.

The barrier layer in the above mentioned patent to Brax et al is a plasticized copolymer of vinylidene chloride and vinyl chloride. The copolymer is a mixture of 10% suspension polymerized and 90% emulsion polymerized copolymer. The emulsion polymerized copolymer comprises about 70% vinylidene chloride and 30% vinyl chloride and the suspension polymerized copolymer comprises about 80% vinylidene chloride and 20% vinyl chloride. Such copolymers are obtainable from the Dow Chemical Company of Midland, Mich. Vinylidene chloride copolymers are also available from Solvay.

In order to be successfully extruded at commercial rates the foregoing described mixture of vinylidene chloride copolymers must be stabilized and plasticized. A successful stabilizer-plasticizer combination is epichlorohydrin/bisphenol, an epoxy resin sold as EPON resin 828 by the Shell Chemical Company, and 2-ethyl hexyl diphenyl phosphate sold as Santicizer-141 by Monsanto Chemical Co. Other known stabilizers include epoxidized linseed oil and epoxidized soybean oil and citrates. A quite successful and satisfactory plasticizer package is made using approximately 4% of the Epon 828 and approximately 2% of the Santicizer-141 in the foregoing described mixture of vinylidene chloride copolymers.

In Canadian Patent No. 968,689, which was issued on Jun. 5, 1975 to Mario Gillio-Tos et al, the effect of plasticizers on the barrier properties of a saran barrier layer in a multi-layer thermoplastic packaging film is described. First, the Gillio-Tos et al patent discloses that homopolymers of vinylidene chloride cannot be converted into film by conventional extrusion techniques because they decompose very rapidly at the temperature of extrusion. Second, by copolymerizing vinylidene chloride with minor amounts of one or more other monomers such as vinyl chloride, methyl acrylate, etc. it is possible to produce copolymers which, when mixed with suitable plasticizers, can be extruded into films which can be oriented by stretching to give shrinkable film. The oriented films are heat shrinkable and are widely used for packaging purposes, particularly for packaging food. As stated, vinylidene chloride copolymers need to be plasticized so that they can be satisfactorily extruded and stretched into oriented films. The greater the proportion of plasticizer the easier the polymer is to extrude and orient and the better the abuse resistance of the final product. On the other hand, the oxygen permeability of the final product also increases with increasing plasticizer content and for many purposes, especially packaging food, it is vital that the oxygen permeability should be low. In recent years, the requirements of the packaging industry have become more and more demanding and for current commercial practices permeability below 100 cc/24 hours/m$^2$/atmosphere is expected and a permeability below 50 is highly desirable.

U.S. Pat. No. 4,686,148, which issued on Aug. 11, 1987 to Marvin R. Havens, and U.S. Pat. No. 4,698,111 which issued on Oct. 6, 1987 to the same inventor, disclose the addition of glycerin and a plasticizer such as epoxidized soybean oil to a vinylidene chloride polymeric composition, in order to lower oxygen permeability and enhance thermal stability of a film having a plasticized layer of vinylidene chloride copolymer.

Accordingly, it is an object of the present invention to provide a vinylidene chloride copolymer composition which has lower oxygen transmission.

By lowering the oxygen transmission, the thickness of barrier layers and, hence, the quantity of saran required for a barrier film is reduced. Also since the thickness of saran layers can be reduced, it is another object of the present invention to provide a film wherein the saran layer is thick enough to be an effective gas barrier but thin enough so that it is not adversely affected to any significant extent by irradiation used to cross-link layers which are cross-linkable and adjacent to the saran layer in a multi-layer film.

Still another object of the present invention is to improve the thermal stability of vinylidene chloride copolymers and to lessen their tendency to degrade while being extruded.

Still another object of the present invention is to increase the extrusion rate of vinylidene chloride copolymer compositions.

Still another object of the present invention is to reduce the stickiness of vinylidene chloride copolymer compositions with respect to metal surfaces in contact with the material during its processing. These surfaces can be on screw flights, channels, and die surfaces. Reduced stickiness allows longer processing times and less disruptions for purging or cleaning the extrusion system.

SUMMARY OF THE INVENTION

It has been discovered that the addition of an acrylate/styrene polymer to a blend of plasticizer and vinylidene chloride copolymer provides several improvements to extrusion of this material and films produced thereby. The enhanced plasticization allows reduction of conventional plasticizers, the reduction of which improves oxygen barrier properties (i.e. reduces oxygen transmission rates). Furthermore, the improved plasticization results in generation of less shear heat during processing which leads to less polymer degradation. This allows reduction or modification to the additives normally required to prevent heat-induced degradation which, in turn, can lead to further oxygen barrier improvements. The sum of these effects permits extrusion speeds and orientation rates to be maintained with improvements in oxygen barrier properties. In a similar manner, extrusion speed and orientation rates can be improved while the required oxygen barrier is provided by a thinner layer of vinylidene chloride copolymer.

Common methods for determining overall thermal stability for extrusion of vinylidene chloride copolymer blends with plasticizers and stabilizers involve working the blend between a pair of heated rollers or inside a heated mixing chamber. The time required for shear and temperature-induced degradation to produce a noticeably blackened polymer is a measure of effectiveness of a plasticizer/stabilizer combination in promoting heat stability. Commercially acceptable vinylidene chloride copolymer plasticizer/stabilizer combinations should show thermal stability times of 10-15 minutes in a mixing chamber such as a Brabender (trademark) blender running at 300° F. and 63 revolutions per minute.

It has been found that the addition of approximately 2% by weight of acrylate/styrene polymer to a blend of 2% by weight of epoxidized oil and 96% vinylidene chloride copolymer will in most cases maintain or improve the thermal stability of the composition (all weight percents herein are weight percents of the final blended composition), compared with a composition of 4% by weight of epoxidized oil and 96% vinylidene chloride copolymer.

Thus, in one aspect, the present invention is an extrudable vinylidene chloride polymeric composition comprising 1% to 4% acrylate/styrene polymer and 1 to 4% plasticizer, especially epoxidized oil, with the balance comprising one or more vinylidene chloride copolymers. Preferred acrylate/styrene polymers are butyl acrylate/methyl methacrylate/styrene polymers. Preferred epoxidized oils are epoxidized linseed oil and epoxidized soybean oil.

In another aspect, the present invention is a multi-layer polymeric film comprising first and second surface layers with a vinylidene chloride copolymer layer disposed between said surface layers in which the vinylidene chloride copolymer layer includes the materials as specified above.

In still another aspect, the present invention is a method of making a film comprising mixing epoxidized soybean oil with vinylidene chloride copolymer; blending the resulting mixture with acrylate/styrene polymer; and thereafter extruding a film from the mixture.

Still other aspects of the present invention include irradiation of a multi-layer film employing acrylate/styrene in the saran layer as specified above to cross-link the cross-linkable layers. Such cross-linkable layers may be surface layers or internal layers in addition to the saran layer and are preferably selected from the group consisting of ethylene-vinyl acetate copolymers, branched polyethylene, linear low density and very low density polyethylene, and blends thereof.

DEFINITIONS

As used herein, the following terms are understood to have the meaning set forth below:

"Polymer" means the product of polymerization and includes but is not limited to homopolymers, monopolymers, copolymers, interpolymers, terpolymers, block copolymers, graft copolymers, alternating copolymers, and addition copolymers.

"Plasticizer" means a substance or material incorporated in a film or film layer to increase the flexibility, workability, or extrudability of the film. These substances include both monomeric plasticizers and polymeric plasticizers and are generally those materials which function by reducing the normal intermolecular forces in a resin thus permitting the macromolecules to slide over one another more freely. Other known plasticizers with epoxy groups attached such as, epichlorohydrin/bisphenol A epoxy, epoxidized linseed oil, and epoxidized soybean oil also function as plasticizers by reducing intermolecular forces and, as well, act as scavengers for HCL.

"Oriented" or "Orientation" refer to the process of stretching a hot plastic article followed by cooling to realign a molecular configuration thus improving mechanical properties. Stretching in one direction is called uniaxial orientation and in two directions is called biaxial orientation. In thermoplastic films which have been oriented there is an internal stress remaining in the plastic sheet which can be relieved by reheating the sheet to a temperature above that at which it was oriented. The material will then tend to shrink back to the original dimensions it had before it was stretch oriented.

"Vinylidene chloride polymer" or "vinylidene chloride copolymer" or "saran" means vinylidene chloride copolymerized with at least one other vinyl type monomer which includes vinyl chloride, methyl acrylate, butyl acrylate, acrylonitrile, and other alkyl acrylates.

"Barrier" refers to a property in thermoplastic materials which indicates that the particular material has a very low permeability to gases. The principal barrier materials referred to herein are the vinylidene chloride copolymers designated as "saran" and hydrolyzed ethylene-vinyl acetate copolymers designated by the abbreviations: "EVOH" or "HEVA".

DETAILED DESCRIPTION

One significant result of the present invention is that the barrier properties of films made in accordance with the present invention are improved while the thermal stability of these same films is usually maintained and in some cases improved as well.

This is demonstrated in Table 2 below which tabulates various barrier (saran) layer resin compositions with the resulting thermal stability and/or oxygen transmission rate for the film samples.

The film structure in each example of Table 2 was: sealant layer/shrink layer/barrier layer/abuse layer where:
  sealant layer = 70% very low density polyethylene + 30% ethylene vinyl acetate copolymer (9% VA);
  shrink layer = ethylene vinyl acetate copolymer (19% VA);
  barrier layer = (to be defined below); and
  abuse layer = ethylene vinyl acetate copolymer (9% VA).

The materials used in the different barrier layer compositions are identified in Table 1 below, with "S" indicating vinylidene chloride copolymer; "O" indicating epoxidized oil; "A" indicating acrylate/styrene copolymer; "AMS" indicating an alternative to the acrylate/styrene copolymer; and "P" indicating alternative plasticizers.

TABLE 1

| Material | Name | Description | Source |
|---|---|---|---|
| S-1 | MA 134 | Vinylidene Chloride/Methyl Acrylate Copolymer (8.5 wt. % MA) | Dow |
| S-2 | WV 323 | Vinylidene Chloride/Vinyl Chloride Copolymer (24 wt. % VC) | Solvay |
| S-3 | PV 858 | Vinylidene Chloride/Vinyl Chloride Copolymer (20 wt. % VC) | Solvay |
| S-4 | PV 891 | Vinylidene Chloride/Methyl Acrylate Copolymer (8.5 wt. % MA) | Solvay |
| O-1 | Vikoflex 7177 | Epoxidized Soybean Oil | Viking |
| O-2 | Plas-Chek 775 | Epoxidized Soybean Oil | Ferro |
| O-3 | Plastoflx 2307 | Epoxidized Soybean Oil | Akzo |
| O-4 | Plastolein 9232 | Epoxidized Soybean Oil | Henkel |
| A-1 | Metablen P 710 | Methyl Methacrylate/Butyl Acrylate/Styrene Polymer | Atochem |
| A-2 | Paraloid K 175 | Methyl Methacrylate/Butyl Acrylate/Styrene Polymer | Rohm & Haas |
| A-3 | Kaneka PA 100 | Methyl Methacrylate/Butyl Acrylate/Styrene Polymer | Kaneka |
| A-4 | Vestiform | Methyl Acrylate/styrene Copolymer | Huels |
| CR | | Calcium Ricinoleate | Caschem |
| AMS-1 | Amoflow 18-240 | Poly(alpha-methylstyrene) | Amoco |
| P-1 | Vikoflex 5075 | Epoxidized Propylene Glycol Dioleate | Viking |
| P-2 | Vikolox 16 | Epoxidized alpha olefin | Viking |

TABLE 2

| Ex. | Composition | Thermal Stability (minutes) | Oxygen Transmission (cc/square meter) (ASTM D 3985) |
|---|---|---|---|
| 1. | 96% S-1 + 4% O-1 | 32.5 | 24.7 |
| 2. | 96% S-1 + 4% O-2 | 36.0 | 24.5 |
| 3. | 96% S-1 + 2% O-2 + 2% A-1 | 38.0 | 13.6 |
| 4. | 96% S-1 + 2% O-2 + 2% A-2 | 28.0 | 12.7 |
| 5. | 96% S-1 + 2% O-2 + 2% A-3 | 30.0 | — |
| 6. | 95.5% S-1 + 2% O-2 + 2% A-3 + 0.5% CR | 45.0 | 15.3 |
| 7. | 95.5% S-1 + 2% O-2 + 2% A-3 + 0.5% 629A | 41.0 | — |
| 8. | 96% S-1 + 4% O-4 | 36.5 | — |
| 9. | 96% S-1 + 4% O-3 | 37.0 | — |
| 10. | 48% S-2 + 48% S-3 + 4% O-2 | 30 | — |
| 11. | 48% S-2 + 48% S-3 + 2% O-2 + 2% A-1 | 27 | — |
| 12. | 47% S-2 + 47% S-3 + 2% O-2 + 4% A-1 | 25 | — |
| 13. | 47.75% S-2 + 47.75% S-3 + 2% O-2 + 2% A-1 + 0.5% CR | 34 | — |
| 14. | 67.2% S-2 + 28.8% S-3 + 4% O-2 | 22 | — |
| 15. | 67.2% S-2 + 28.8% S-3 + 2% O-2 + 2% A-1 | 17 | — |
| 16. | 65.8% S-2 + 28.2% S-3 + 2% O-2 + 4% A-1 | 16 | — |
| 17. | 66.85% S-2 + 28.65% S-3 + 2% O-2 + 2% A-1 + 0.5% CR | 22 | — |
| 18. | 96% S-4 + 2% O-2 + 2% A-3 | — | 18.4 |
| 19. | 96% S-4 + 2% O-2 + 2% A-3 | — | 20.4 |
| 20. | 96% S-1 + 2% O-1 + 2% A-3 | — | 17.5 |
| 21. | 96% S-1 + 2% O-1 + 2% A-2 | — | 14.5 |
| 22. | 96% S-4 + 4% O-1 | — | 35.7 |
| 23. | 96% S-1 + 2% O-2 + 2% AMS-1 | 40.0 | |
| 24. | 96% S-1 + 4% P-1 | 40.0 | |
| 25. | 96% S-1 + | 75.0 | |

TABLE 2-continued

| Ex. | Composition | Thermal Stability (minutes) | Oxygen Transmission (cc/square meter) (ASTM D 3985) |
|---|---|---|---|
| | 4% P-2 | | |

Note that the S-4 of Example 18 had average particle size of 165 microns, and the S-4 of Example 19 had average particle size of 189 microns.

It is thus seen that the product of this invention produces superior results. While many details of the invention are specified above such details are by way of examples and are not limiting. The spirit and scope of the invention are limited only as set forth in the following claims. Materials such as poly(alpha-methylstyrene) can be substituted for the acrylate/styrene polymer with beneficial effect.

I claim:

1. A multi-layer polymeric film comprising:
 (a) first and second polymeric surface layers; and
 (b) a vinylidene chloride polymeric layer disposed between said surface layers comprising:
  (1) 1% to 4% plasticizer;
  (2) 1 to 4% acrylate/styrene polymer; and
  (3) the balance of 92% to 98% comprising at least one vinylidene chloride polymer.

2. The film of claim 1 wherein said surface layers comprise polyolefin materials.

3. The film of claim 1 in which the vinylidene chloride polymeric layer includes 1% to 4% of a plasticizer selected from the group consisting of epoxidized linseed oil, epoxidized soybean oil, epoxidized alpha olefin, epoxidized ester, and tetraethylene glycol di(2-ethylhexoate).

4. The film of claim 1 wherein the acrylate/styrene polymer is a butyl acrylate/methyl methacrylate/styrene polymer.

5. The film of claim 2 wherein said polyolefin materials are selected from the group consisting of: ethylene-vinyl acetate copolymers, branched low density polyethylene, linear low density polyethylene, and very low density polyethylene and blends thereof.

6. The film of claim 1 wherein at least one layer of the multi-layer film is biaxially oriented.

7. The film of claim 1 wherein the multi-layer film has been cross-linked to a dosage less than 4.0 MR.

8. The film of claim 1 in which the vinylidene chloride polymeric layer includes 1% to 4% of a plasticizer selected from plasticizers with epoxy groups.

* * * * *